United States Patent [19]

Okazaki et al.

[11] Patent Number: 4,627,664
[45] Date of Patent: Dec. 9, 1986

[54] SEAT ASSEMBLY

[75] Inventors: Hiroshi Okazaki; Motoi Hyodo, both of Toyota, Japan

[73] Assignee: Aisin Seiki Kabushiki Kaisha, Japan

[21] Appl. No.: 544,054

[22] Filed: Oct. 21, 1983

[30] Foreign Application Priority Data

Oct. 28, 1982 [JP] Japan ................................ 57-189872

[51] Int. Cl.[4] .......................... A47C 7/18; B32B 3/06; B32B 5/18
[52] U.S. Cl. ..................................... 297/452; 5/471; 297/219; 297/DIG. 1; 428/198; 428/247; 428/255
[58] Field of Search ......... 297/219, 452, 458, DIG. 1; 5/471, 472; 428/196, 198, 247, 255

[56] References Cited

U.S. PATENT DOCUMENTS

| | | | |
|---|---|---|---|
| 2,303,195 | 11/1942 | Buff ................................ | 428/247 X |
| 2,782,839 | 2/1957 | Cole ................................ | 297/219 |
| 3,649,974 | 3/1972 | Baruth et al. ................. | 297/458 X |
| 3,794,378 | 2/1974 | Haslam et al. ................ | 297/219 |
| 3,961,823 | 6/1976 | Caudill, Jr. .................... | 297/452 |
| 4,378,396 | 3/1983 | Urai et al. ..................... | 428/196 |

FOREIGN PATENT DOCUMENTS 2644592 4/1978 Fed. Rep. of Germany ...... 297/452

Primary Examiner—Francis K. Zugel
Assistant Examiner—Peter R. Brown
Attorney, Agent, or Firm—Finnegan, Henderson, Farabow, Garrett & Dunner

[57] ABSTRACT

A seat cushion having a member in the shape of, for example, a net embedded in a cushion pad, having required portions exposed above the surface of the pad, and formed from a material which is weldable by high frequency electric heating. The exposed portions are welded to a pad cover to secure it to the pad.

6 Claims, 11 Drawing Figures

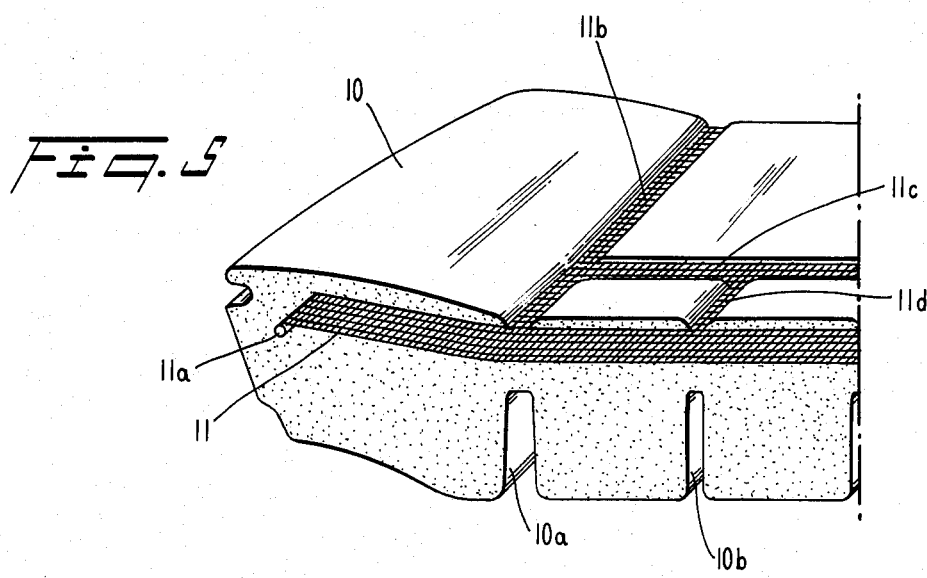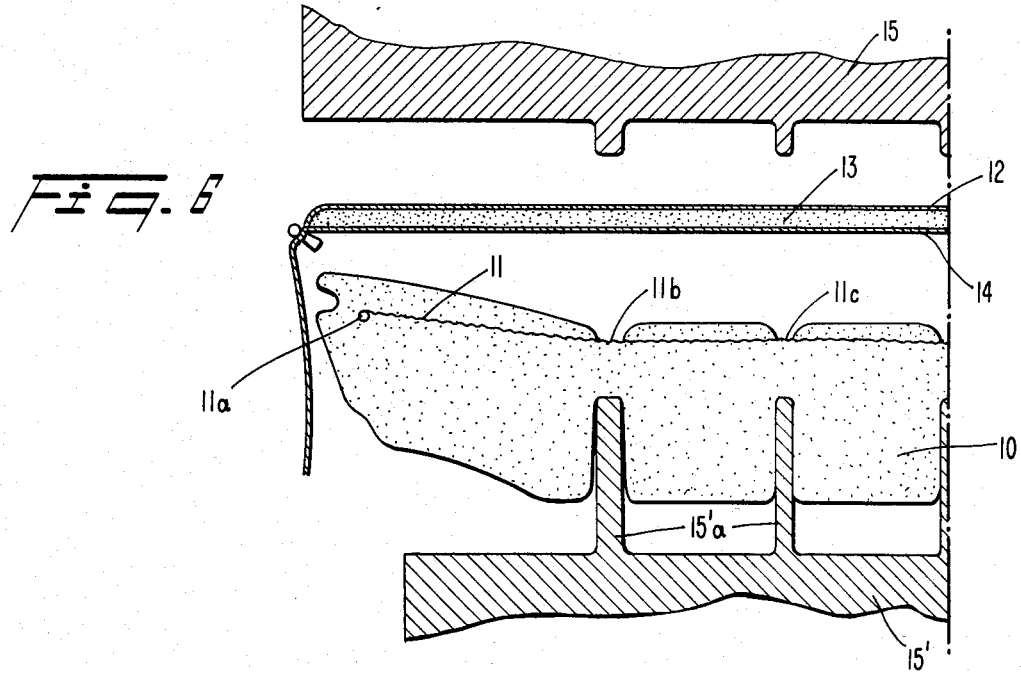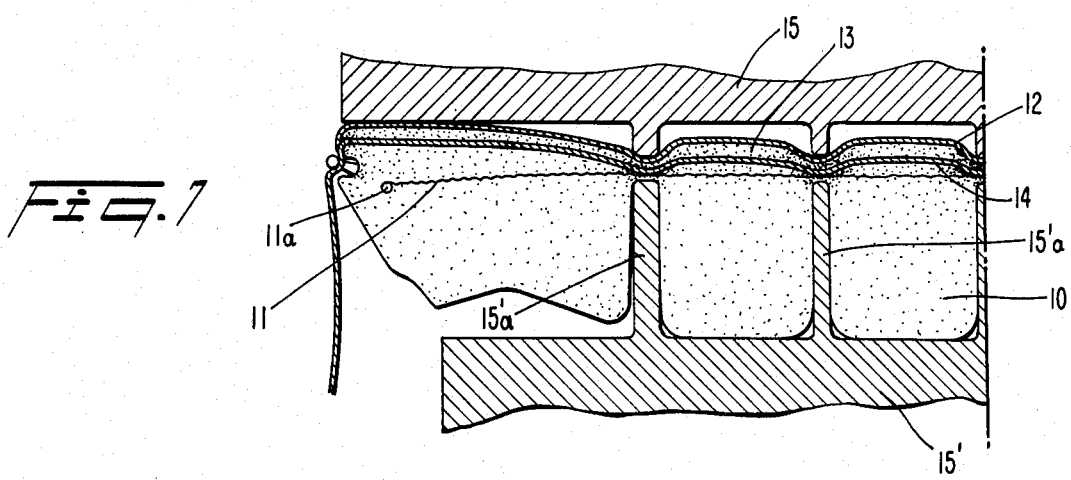

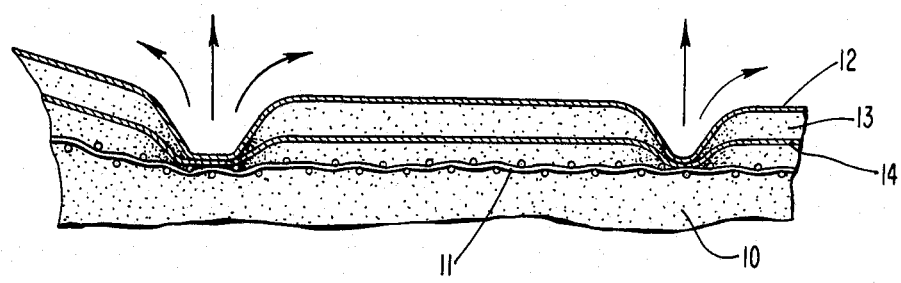
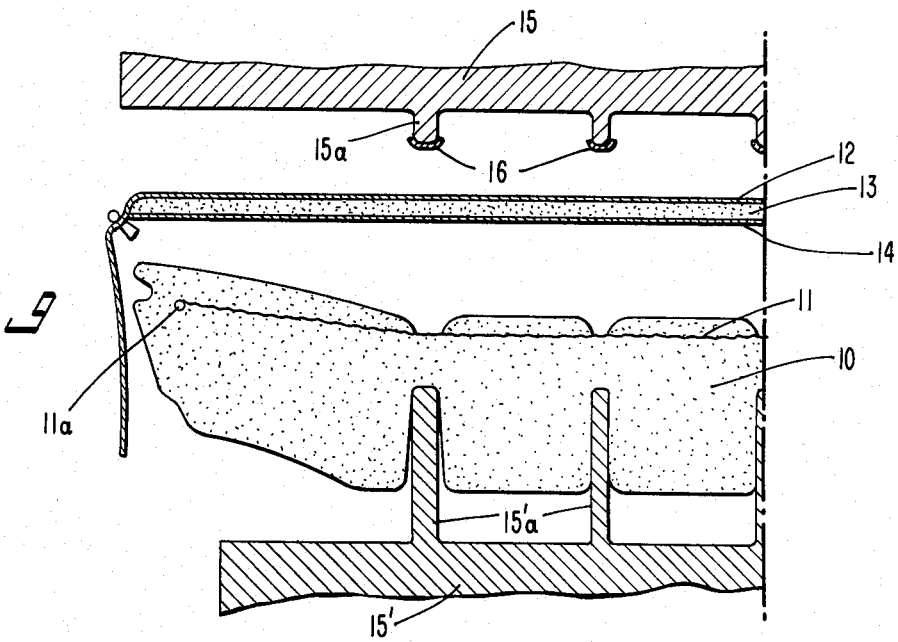
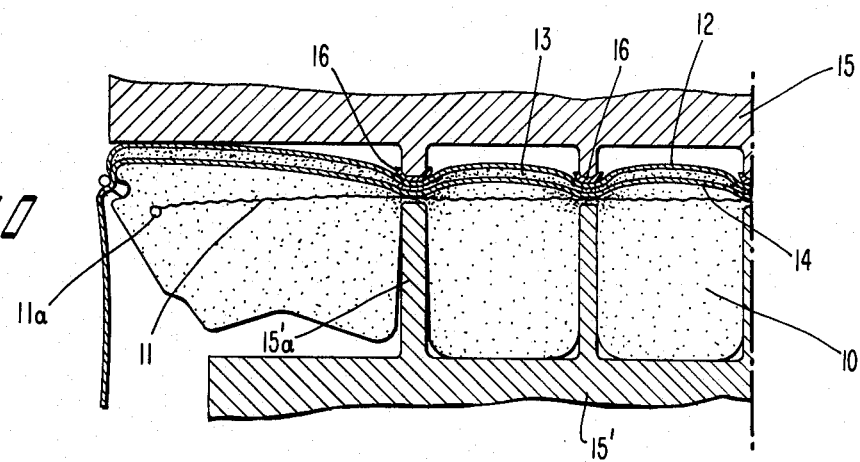
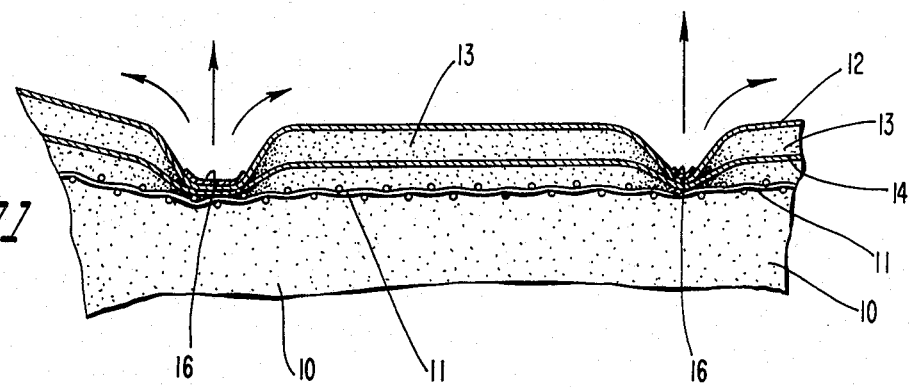

SEAT ASSEMBLY

BACKGROUND OF THE INVENTION

1. Field of the Invention

This invention relates to a seat assembly, and more particularly, a cushion in a seat assembly for a vehicle.

2. Description of the Prior Art

A seat cushion usually has a depressed central portion which enables a person seated thereon to maintain a stable posture and a nice sitting comfort. A seat cushion essentially comprises a pad formed from a urethane foam, and a cover enclosing the pad. Various methods have been proposed for attaching the cover to the cushion pad in such a way that the cushion may have a depressed central portion.

A conventional seat cushion is generally shown as A in FIG. 1, and has a depressed central portion B. It comprises a cover 1 having a plurality of hanger bags 1a, and a pad 2 in which a wire 3 is embedded. The hanger bags 1a are joined to the wire 3 by a plurality of clasps 4. The reaction of the wire and the clasps against the weight of a person seated on the cushion, however, is generally uncomfortable. Moreover, this seat cushion requires a lot of time to manufacture, and is, therefore, expensive.

Another seat cushion has been proposed to improve the drawbacks of the prior art. It comprises a cover 5 formed from a material which is weldable by high frequency electric heating, a layer of urethane wadding 6, a urethane foam pad 7, and a calico backing 8, as shown in FIG. 4. This seat cushion is manufactured by placing the various members of the cushion between the upper and lower halves 9 and 9' of a high frequency electric welder, compressing them as shown in FIG. 3, and applying a high frequency voltage to the welder to weld the cover 5 and the pad 7 to each other as shown at 5a to 5c in FIG. 4. This seat cushion is, however, unsatisfactory in durability. The joints 5a to 5c are not sufficiently strong and lose their resistance to vibration, friction, or the like, resulting in the separation of the pad from the cover, after a relatively short period of time.

SUMMARY OF THE INVENTION

It is an object of this invention to provide a seat cushion which is comfortable to sit on, simple in construction and inexpensive to manufacture.

It is another object of this invention to provide a seat cushion which is strong and durable for a long period of time.

These objects are attained by employing a member formed from a material which is weldable by high frequency electric heating, and embedded in a pad so as to expose some portions above the pad surface, and a cover formed from a similar weldable material or having a member formed from any such material, so that the embedded member may be welded to the cover or the member to thereby secure the cover to the pad firmly.

The member embedded in the pad may, for example, be shaped in the form of a net, while the member on the cover may, for example, comprise a tape. This tape is not only structurally important, but also provides the seat with an improved decorative feature.

The inventors of this invention are aware of U.S. Pat. No. 3,794,378 to Haslam et al. as one of the relevant prior art publications.

BRIEF DESCRIPTION OF THE DRAWINGS

FIG. 5 is a fragmentary perspective view of a pad for a seat cushion embodying this invention;

FIG. 6 is a fragmentary transverse sectional view showing the procedure for the assembly of a seat cushion employing the pad shown in FIG. 5;

FIG. 7 is a fragmentary transverse sectional view of the seat cushion as assembled by the procedure shown in FIG. 6;

FIG. 8, is an enlarged fragmentary transverse sectional view of the seat cushion assembled as shown in FIG. 7; and FIGS. 9 to 11 are views similar to FIGS. 6 to 8, respectively, but showing a different embodiment of this invention.

DETAILED DESCRIPTION OF THE INVENTION

Figure 1:
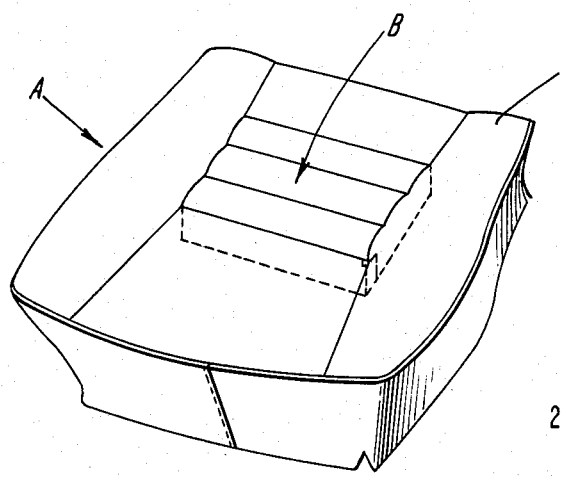
FIG. 1 is a perspective view of a conventional seat cushion.
Figure 2:
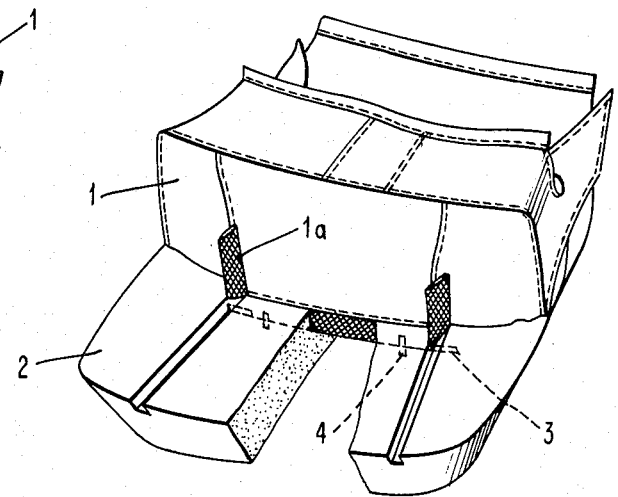
FIG. 2 is a perspective view showing the internal construction of the cushion shown in FIG. 1 in which a portion of the cover is raised and the pad is partially cut away.
Figure 3:
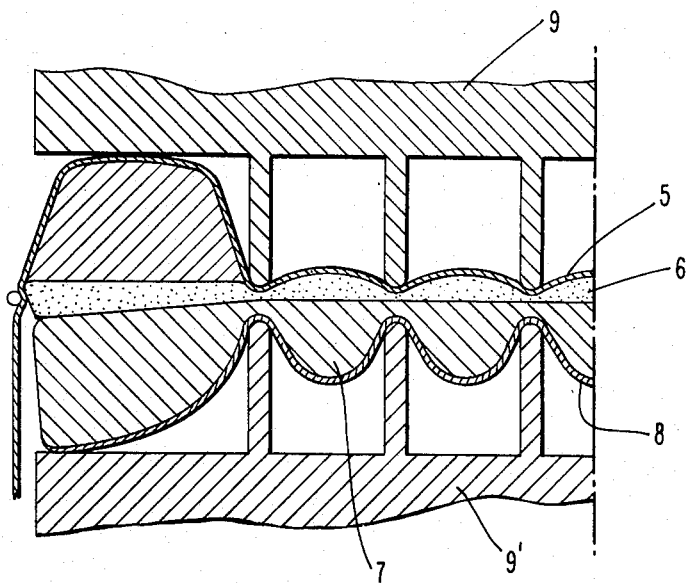
FIG. 3 is a fragmentary transverse sectional view showing the procedure for manufacturing another conventional seat cushion.
Figure 4:
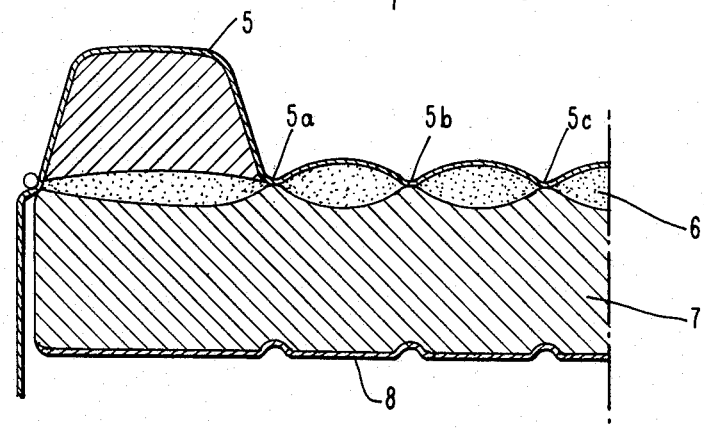
FIG. 4 is a fragmentary transverse sectional view of the seat cushion manufactured in accordance with the procedure shown in FIG. 3.

Referring to FIG. 5 of the drawings, there is shown a pad 10 formed from a urethane foam for a seat cushion embodying this invention. A net 11 is embedded in the pad 10, and extends transversely through the pad 10 between a pair of support members 11a, of which only one is shown. The net 11 is formed from a material which is weldable by high frequency electric heating, such as nylon, polyester or vinyl chloride. The net 11 has a plurality of portions exposed above the surface of the pad 10 as shown at 11b to 11d. The pad 10 also has a number of slits 10a and 10b provided for receiving the electrodes of a high frequency electric welder when the seat cushion is assembled, positioning the pad 10 and maintaining it in proper shape.

The seat cushion further includes a cover 12 formed from a material which is weldable by high frequency electric heating, such as nylon, polyester or vinyl chloride, a layer of urethane wadding 13, and a backing 14 for the wadding 13. The backing 14 is preferably formed from a material which is weldable by high frequency electric heating, but may be formed from any other material, too. Moreover, the backing 14 can, as a whole, be omitted under certain conditions.

FIGS. 6 and 7 show the procedure for the assembly of the seat cushion. The pad 10 is placed between the upper and lower halves 15 and 15' of a high frequency electric welder, and engaged with the electrodes 15'a provided on the lower half 15' of the welder, while the assembly of the cover 12, the wadding 13 and the backing 14 is positioned over the pad 10, as shown in FIG. 6. The upper and lower halves 15 and 15' of the welder are moved toward each other to bring the cover assembly and the pad into contact with each other under pressure, and electricity is supplied to the electrodes 15'a, whereby the cover 12 is welded to the exposed portions 11b to 11d of the net 11 and thereby joined securely to the pad 10, as shown in FIGS. 7 and 8.

Another embodiment of this invention is shown in FIGS. 9 to 11. This seat cushion is distinguished from the seat cushion hereinabove described with reference to FIGS. 6 to 8, by including a plurality of tapes 16 formed from a material which is weldable by high frequency electric heating, such as nylon, polyester or vinyl chloride. The tapes 16 are carried by the electrodes 15a provided on the upper half 15 of the welder, and welded to the cover 12 and the exposed portions of the net 11 embedded in the pad 10. The pad 10 is identical to that shown in FIG. 5. The cover 12 is preferably formed from a material which is weldable by high frequency electric heating, but it is equally possible to employ a different material for the cover. The tapes 16 not only provide an improved joint between the pad and the cover, but also gives the seat an improved decorative feature, if their design, color, shape, position and combination are appropriately selected.

While the invention has been described with reference to the preferred embodiments thereof, it is to be understood that modifications or variations may be easily made by anybody of ordinary skill in the art without departing from the scope of this invention which is defined by the appended claims.

What is claimed is:

1. A seat assembly having a seat cushion comprising:
   a seat pad having an outer surface;
   a pair of support members embedded within said seat pad and extending along a substantial portion of said seat pad between said pair of support members, said net including predetermined sections extending along said outer surface and being formed of a heat weldable material; and
   a seat cover enveloping a portion of said outer surface, said predetermined sections of said net being welded to said seat cover.

2. The seat assembly as defined in claim 1, wherein said seat cover is also formed of said heat weldable material.

3. The seat assembly as defined in claim 1, further including a plurality of means formed of said heat weldable material for adhering said heat pad to said seat cover, said adhering means being positioned on said seat cover proximate said predetermined sections.

4. The seat assembly as defined in claim 3, wherein said adhering means include a plurality of individual tape sections.

5. The seat assembly as defined in any one of claims 1 through 4, wherein said heat weldable material consists of material weldable by high frequency electric heating selected from a group consisting of nylon, polyester and vinyl chloride.

6. The seat assembly as defined in claim 1, wherein said predetermined sections are arranged as a plurality of interconnected strips of said heat weldable material.

* * * * *